(12) United States Patent
Maruoka

(10) Patent No.: US 6,617,022 B2
(45) Date of Patent: Sep. 9, 2003

(54) RUBBER THREAD FOR GOLF BALL

(75) Inventor: Kiyoto Maruoka, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 09/770,465

(22) Filed: Jan. 29, 2001

(65) Prior Publication Data

US 2001/0019769 A1 Sep. 6, 2001

(30) Foreign Application Priority Data

Feb. 22, 2000 (JP) ........................................ 2000-045022

(51) Int. Cl.$^7$ ............................. D02G 3/00; B29D 31/00
(52) U.S. Cl. ........................ 428/364; 428/375; 428/397; 264/147; 264/146; 264/236; 473/371
(58) Field of Search ................................. 264/147, 146, 264/236; 428/364, 375, 397; 473/371

(56) References Cited

U.S. PATENT DOCUMENTS

| | | | |
|---|---|---|---|
| 2,253,067 A | * 8/1941 | Drawmann | 18/54 |
| 2,297,622 A | * 9/1942 | Herman | 18/8 |
| 3,991,151 A | * 11/1976 | Schiesser | 264/145 |
| 5,679,196 A | * 10/1997 | Wilhelm et al. | 156/167 |
| 5,804,307 A | * 9/1998 | Wilhelm et al. | 428/373 |
| 6,258,302 B1 | * 7/2001 | Nesbitt | 264/40.1 |
| 6,361,452 B1 | * 3/2002 | Maruko et al. | 473/356 |
| 2001/0019769 A1 | * 9/2001 | Maruoka | 428/401 |
| 2001/0051550 A1 | * 12/2001 | Maruoka | 473/356 |
| 2002/0052252 A1 | * 5/2002 | Maruoka | 473/372 |
| 2002/0058554 A1 | * 5/2002 | Maruoka | 473/371 |

FOREIGN PATENT DOCUMENTS

| | | |
|---|---|---|
| JP | 5634736 | 4/1981 |
| JP | A114913 | 1/1999 |

* cited by examiner

Primary Examiner—Cynthia H. Kelly
Assistant Examiner—J. M. Gray
(74) Attorney, Agent, or Firm—Birch, Stewart, Kolasch & Birch, LLP

(57) ABSTRACT

A manufacturing method for obtaining a rubber thread by (a) feeding a rubber composition (8) between a heat roller (3) and a belt (7) pressed against the heat roller (3) and pressurizing and crosslinking the rubber composition (8) by means of the heat roller (3) and the belt (7), thereby obtaining a crosslinked sheet material, and (b) cutting the crosslinked sheet material to obtain the rubber thread. A pressure to be applied to the rubber composition (8) at the crosslinking step is 0.03 Mpa to 1 Mpa. The rubber composition (8) fed at the crosslinking step is previously formed into a sheet by extrusion. Since a dry blend method is employed for the manufacturing method, a great workability can be obtained. The rubber thread obtained by the manufacturing method is easily stretched and is broken with difficulty during the stretch.

6 Claims, 3 Drawing Sheets

RUBBER THREAD FOR GOLF BALL

BACKGROUND OF THE INVENTION

1. Field of the Invention

The present invention relates to a rubber thread to be used for a wound golf ball and a method of manufacturing the rubber thread.

2. Description of the Related Art

A golf ball to be used for a play in a golf course is roughly divided into a wound golf ball having a core on which a rubber thread is wound and a solid golf ball (two pieces golf ball, three pieces golf ball and the like) having a core formed of a solid rubber. In general, the wound golf ball is excellent in a hit feeling and control performance and the solid golf ball is excellent in flight performance and durability. The wound golf ball has been used for a long time. For a certain period, almost all first-class golf balls were represented by the wound golf balls. The solid golf ball developed later can be manufactured easily at a low cost. In recent years, therefore, more solid golf balls than the wound golf balls have been put on the market. Under the circumstances, a professional golf player and an advanced amateur golf player tend to prefer the wound golf ball excellent in the hit feeling and the control performance.

As a method of manufacturing a rubber thread for the wound golf ball, a so-called latex blend method has been used for a long time. In the latex blend method, first of all, a crosslinking agent, an additive and the like are mixed into a rubber latex. Next, a conveyer belt having a surface to which a liquid coagulant is stuck is caused to pass through a latex composition. Consequently, the latex composition is stuck to the conveyer belt and coagulates. Thus, a rubber sheet is obtained. The rubber sheet is cut to have a predetermined width after the crosslinking. Consequently, a rubber thread is obtained.

Since the rubber thread obtained by the latex blend method has a uniform thickness, there is an advantage that the rubber thread is broken with difficulty when it is to be wound with a high draw ratio (usually, 600% to 1000%). Moreover, since the rubber thread obtained by the latex blend method has a low modulus, it is sufficiently stretched with a comparatively small tension. Therefore, the rubber thread obtained by the latex blend method can be wound as a core with a high density. A golf ball having the core has great resilience performance.

However, a liquid rubber latex is used in the latex blend method. Therefore, a working efficiency is poor and a working environment is not preferable. In addition, the rubber latex is expensive. Consequently, the cost of a material for the golf ball is increased.

As another rubber thread manufacturing method, Japanese Laid-Open Patent Publication No. 56-34736 (1981) has disclosed a dry blend method (which does not use the rubber latex). In the dry blend method, a solid rubber, a crosslinking agent, an additive and the like are kneaded by means of a kneading machine (a kneader, a Banbury mixer or the like) to obtain a rubber composition which is to be sheet-shaped by means of a calender or the like. The sheet is cut so that a rubber thread is obtained. In the dry blend method, a compounding agent is easily mixed by the kneading machine and a process is therefore simple. Accordingly, a high working efficiency can be obtained. Moreover, a working environment is also preferable.

However, a rubber thread obtained by the dry blend method has a nonuniform thickness and it has a rough surface. Therefore, the rubber thread has such a drawback that breakage (so-called thread cutting) is apt to be caused during winding. If the rubber thread is thick, the thread cutting is caused with difficulty. However, the thick rubber thread is stretched insufficiently. For this reason, a core has a low rubber thread density. A rubber thread blending an activator such as zinc oxide in a large amount causes the thread cutting with difficulty. In this case, a modulus of the rubber thread is increased and a density of the rubber thread in a core is reduced. A golf ball using a core with a low density of the rubber thread has a low hardness and a low resilience coefficient.

Japanese Laid-Open Patent Publication No. 11-4913 (1999) has disclosed a rubber thread using a natural rubber subjected to a protein removing treatment. The rubber thread is obtained by the dry blend method and causes the thread cutting with difficulty. In addition, the rubber thread contributes to an increase in resilience of the golf ball. However, the rubber thread is obtained through the protein removing step as described above. Therefore, a manufacturing process is complicated.

There is also supposed means for extruding a rubber composition obtained by the dry blend method like a sheet, carrying out a roller processing on the sheet-shaped rubber composition to reduce a thickness (Japanese Patent Application No. 11-344823(1999)). By the roller processing, the thickness of the rubber thread is made uniform and the thread cutting can be controlled to some extent. However, the surface roughness of the rubber thread cannot be reduced sufficiently by the roller processing. Accordingly, the thread cutting is generated more easily than that of a rubber thread obtained by the latex blend method.

SUMMARY OF THE INVENTION

Under the actual circumstances, thus, there has not been obtained a rubber thread which has a great workability during manufacture and causes thread cutting with difficulty.

In consideration of such a problem, it is an object of the present invention to provide a rubber thread for a golf ball which is obtained by a dry blend method but is stretched easily and is broken with difficulty during the stretch.

In order to achieve the object, the present invention provides a method of manufacturing a rubber thread for a golf ball comprising the following steps (a) and (b):

(a) feeding a rubber composition between a heat roller and a belt pressed against the heat roller and pressurizing the rubber composition by means of the heat roller and the belt, thereby obtaining a crosslinked sheet material; and (b) cutting the crosslinked sheet material to obtain the rubber thread.

In the manufacturing method, the rubber composition is crosslinked while being pressed by the heat roller and the belt. Therefore, the rubber thread thus obtained has a uniform thickness and a small surface roughness. Accordingly, when the rubber thread is to be wound, thread cutting is caused with difficulty. By the manufacturing method, therefore, the thickness of the rubber thread can be reduced. Since the rubber thread having a small thickness can be stretched easily, a density of the rubber thread in a core can be increased. In the manufacturing method, moreover, a rubber latex is not used. Consequently, a great workability and a preferable working environment can be obtained.

It is preferable that a pressure to be applied to the rubber composition at a crosslinking step should be 0.03 MPa to 1 MPa. Accordingly, a small surface roughness of the rubber thread is compatible with a low modulus.

Preferably, the sheet-shaped rubber composition extruded from an extruder is supplied at the crosslinking step. Consequently, the thickness of the rubber thread can be made more uniform.

It is preferable that a ten-point mean roughness Rz of the rubber thread is 40 μm or less. Consequently, the thread cutting can be prevented more greatly. Preferably, the rubber thread has a thickness of 0.35 mm to 0.6 mm. Similarly, the thread cutting can be prevented more greatly.

The above and further objects and features of the invention will more fully be apparent from the following detailed description with accompanying drawings.

DESCRIPTION OF THE PREFERRED EMBODIMENTS

Figure 1:
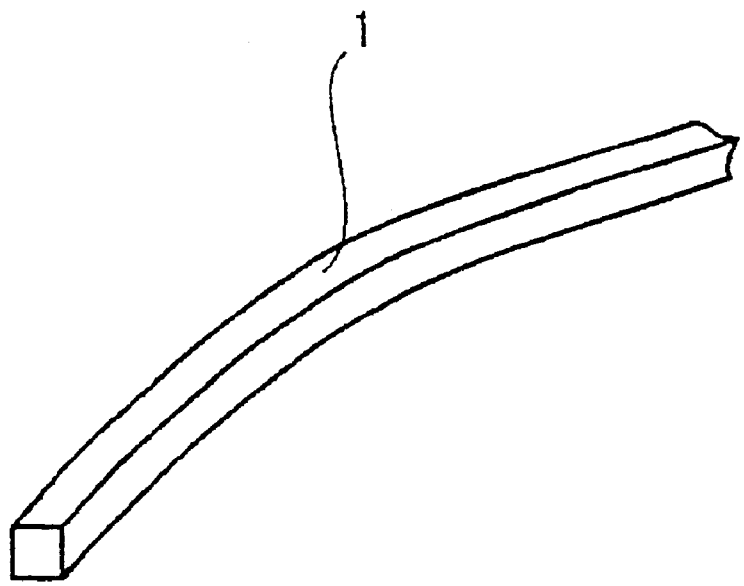
FIG. 1 is a perspective view showing a rubber thread for a golf ball according to an embodiment of the present invention.

FIG. 1 is a perspective view showing a rubber thread 1 for a golf ball (which will be hereinafter referred to as a "rubber thread 1") according to an embodiment of the present invention.

A base rubber of a rubber composition constituting the rubber thread 1 may be a natural rubber or a synthetic rubber. Usually, the natural rubber and an isoprene rubber are blended for the use. By using the natural rubber, thread cutting can be controlled. By using the isoprene rubber, the resilience performance of the golf ball can be enhanced. In particular, trans-polyisoprene containing a trans part in a large amount is suitable in respect of the resilience performance.

In general, sulfur is used as a crosslinking agent to be blended with the rubber composition. A phenolic antioxidant or other additives may be blended with the rubber composition. Zinc oxide to be an activators may be blended with the rubber composition. The zinc oxide tends to increase a modulus of the rubber thread 1, thereby stretching the rubber thread 1 with difficulty. Therefore, it is preferable that a blending amount should be minimized.

The rubber thread 1 having a small surface roughness causes less thread cutting than a rubber thread having a great surface roughness. It is guessed that a stress concentration is caused with more difficulty during the stretch if the surface roughness is smaller. More specifically, it is preferable that a ten-point mean roughness Rz of the rubber thread 1 should be 40 μm or less, and more preferably, 20 μm or less. It is preferable that the ten-point mean roughness Rz should be reduced. The ten-point mean roughness Rz is usually set to 5 μm or more, particularly, 10 μm or more in respect of productivity. The ten-point mean roughness Rz is measured in accordance with JIS-B-0601. The ten-point mean roughness Rz (in a unit of μm) is obtained by extracting a reference length from a roughness curve of the rubber thread 1 and summing, for a mean value of the reference length portion, a mean absolute value of an altitude from the highest crest in a vertical direction to a fifth highest crest and a mean absolute value of an altitude from the lowest bottom to a fifth lowest bottom. The ten-point mean roughness Rz of a crosslinked sheet material may be measured for convenience.

Preferably, the thickness of the rubber thread 1 is 0.35 mm to 0.6 mm, and more preferably, 0.4 mm to 0.55 mm. If the thickness is less than the above-mentioned range, the thread cutting may be often caused. If the thickness exceeds the same range, the rubber thread 1 is stretched with difficulty during winding. For this reason, the density of the rubber thread 1 in the core is reduced in some cases. A golf ball using a core with the small density of the rubber thread 1 has a low hardness and has resilience performance deteriorated. The thickness of the rubber thread 1 in the crosslinked sheet material may be measured for convenience.

Preferably, a standard deviation a of the thickness of the rubber thread 1 is 0.03 or less, and more preferably, 0.02 or less. When the standard deviation σ exceeds the above-mentioned range, the thread cutting might be often caused. The standard deviation σ of the crosslinked sheet material may be measured by a method which will be described below in detail.

The rubber thread 1 is obtained through a kneading step, an extruding step, a crosslinking step and a cutting step, for example. At the kneading step, first of all, a base rubber, a crosslinking agent, an additive and the like are kneaded so that a rubber composition is obtained. An internal kneading machine as a kneader or a Banbury mixer, an open roll and the like are used for the kneading.

At the extruding step, next, the rubber composition obtained at the kneading step is put into a cylinder of an extruder and is extruded from a die of a head portion. An opening of the die is slit-shaped and the rubber composition is extruded like a sheet. By using the extruder, the thickness of the rubber thread 1 finally obtained can be prevented from being varied. Most preferably, a screw type uniaxial extruder is used. In the screw type uniaxial extruder, an orientation of the rubber is controlled. Therefore, the rubber composition less shrinks after the extrusion. Consequently, the thickness can be prevented from being nonuniform. In the screw type uniaxial extruder, it is preferable that the number of rotations of a screw should be set to 20 rpm to 60 rpm, particularly, 20 rpm to 40 rpm in respect of the uniform thickness of the rubber composition, and furthermore, the uniform thickness of the rubber thread 1.

Preferably, an internal temperature of the cylinder of the screw type uniaxial extruder is 50° C. to 100° C., and more preferably, 60° C. to 90° C. By setting the internal temperature of the cylinder to this range, concavo-convex portions can be prevented from being formed on a surface of the rubber composition extruded like a sheet and scorching can be prevented. Preferably, an internal temperature of the head portion is 80° C. to 110° C., and more preferably, 80° C. to 100° C. By setting the internal temperature of the head portion to this range, the concavo-convex portions can be well prevented from being formed on the surface of the rubber composition and the scorching can be prevented. It is preferable that a mesh should be provided in the cylinder. Foreign substances in the rubber composition are removed by means of the mesh. If the mesh is too coarse, the foreign substance can no be removed. However, if the mesh is too fine, a rubber passing through the mesh is scorched due to heat generation. For this reason, it is preferable that a mesh of #60 to #120 should be used.

Preferably, the thickness of the extruded rubber composition is 2 mm to 6 mm, and more preferably, 3 mm to 5 mm. If the thickness is less than the above-mentioned range, the scorching is sometimes caused due to the heat generation of the rubber composition. If the thickness exceeds the same range, a considerable reduction in the thickness is required at the next step. Consequently, the thickness of the crosslinking sheet material becomes nonuniform in some cases.

The thickness of the rubber composition thus extruded is usually reduced through a roller processing or the like. By using a roller head extruder, the extrusion and the roller processing may be carried out in a single pass.

Figure 2:
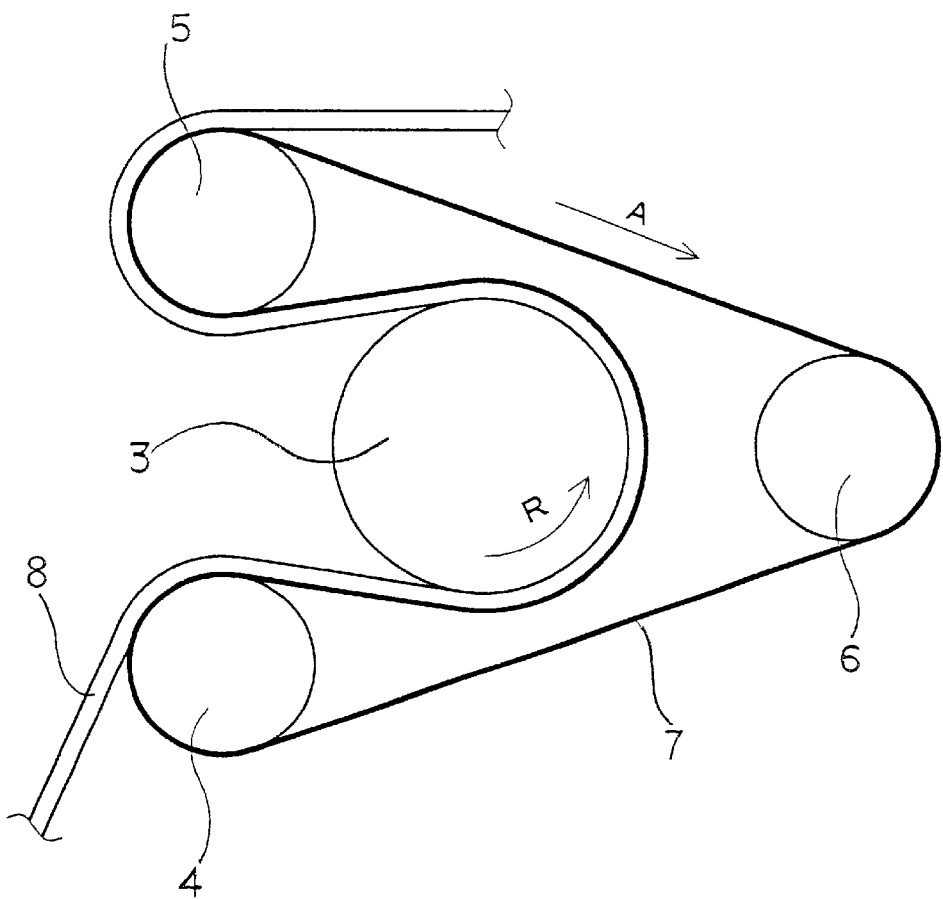
FIG. 2 is a front view typically showing an example of a method of manufacturing a rubber thread for a golf ball according to the present invention.

At the crosslinking step, the rubber composition is crosslinked. FIG. 2 is a front view typically showing a continuous crosslinking device 2 to be used for the crosslinking step. The continuous crosslinking device 2 comprises a heat roller 3, a first auxiliary roller 4, a second auxiliary roller 5, a third auxiliary roller 6 and a belt 7. The heat roller 3 is rotated in a direction shown by an arrow R in FIG. 2. The belt 7 is seamless and is pressed against the heat roller 3 at a constant pressure. The belt 7 is rotated in a direction shown by an arrow A in FIG. 2. Examples of the continuous crosslinking device 2 include a Rote-Cure manufactured by Adamson Co., Ltd. in U.S.A., an AUMA manufactured by Berstorff Co., Ltd. in Germany and the like.

In the continuous crosslinking device 2, first of all, a sheet-shaped rubber composition 8 is fed onto the belt 7 in the vicinity of the first auxiliary roller 4. Then, the rubber composition 8 reaches the heat roller 3 with the movement of the belt 7 and is rotated in such a state as to be interposed between the heat roller 3 and the belt 7. While the rubber composition 8 abuts on the heat roller 3, it receives heat from the heat roller 3 to cause a crosslinking reaction. Thus, a crosslinked sheet material is obtained. By regulating a rotating speed of the heat roller 3, a time required for the abutment of the rubber composition 8 on the heat roller 3 (that is, a crosslinking time) is adjusted. Subsequently, the crosslinked sheet material goes away from the heat roller 3 to reach the vicinity of the second auxiliary roller 5 where the crosslinked sheet material is separated from the belt 7.

The rubber composition 8 is pressurized while being interposed between the heat roller 3 and the belt 7. By the pressurization, the surface roughness of the crosslinked sheet material is controlled. Preferably, a pressure is 0.03 MPa to 1 MPa, and more preferably, 0.1 MPa to 0.3 MPa. When the pressure is less than the above-mentioned range, the surface roughness of the crosslinking sheet material might be increased. If the pressure exceeds the same range, a modulus of the rubber thread 1 might be increased. The pressure can be regulated through the adjustment of the positional relationship among the heat roller 3, the first auxiliary roller 4, the second auxiliary roller 5 and the third auxiliary roller 6, the adjustment of the number of rotations of the first auxiliary roller 4 and the second auxiliary roller 5, and the like.

Examples of the belt 7 to be used include a metallic belt, a rubber belt reinforced with a cloth or a metal wire, a felt belt and the like. It is preferable that the surface roughness of the belt 7 should also be small in order to reduce the surface roughness of the rubber thread 1. More specifically, it is preferable that the belt 7 should have a ten-point mean roughness Rz of 40 μm or less, particularly, 20 μm or less. Examples of the belt 7 having a small surface roughness include a metallic belt and a rubber belt.

It is preferable that a crosslinking temperature in the continuous crosslinking device 2 should be 140° C. to 160° C. If the crosslinking temperature is less than the above-mentioned range, the crosslinking time should be increased so that productivity might be deteriorated. If the crosslinking temperature exceeds the same range, over-cure is caused to degrade the physical property of the rubber thread 1. The crosslinking time in the continuous crosslinking device 2 is usually set to approximately 3 minutes to 20 minutes.

In the continuous crosslinking device 2, the sheet-shaped rubber composition 8 is crosslinked while abutting on the heat roller 3. In a conventional crosslinking method in which an uncrosslinked rubber sheet is wound onto the roller in many plies and is crosslinked by a vulcanizer, a variation in the physical property is caused by a difference in a heat conductivity between an inside sheet and an outside sheet. However, the use of the continuous crosslinking device 2 can prevent the physical property from being varied.

The crosslinked sheet is cut to have a predetermined width at the cutting step. A well-known cutter can be used for the cutting. Thus, the rubber thread 1 can be obtained.

EXAMPLES

Although the effects of the present invention will be apparent based on an example, it is a matter of course that the present invention should not be construed to be restricted based on the description of the example. In the following description of a blending amount, a numeric value of "part" implies a ratio obtained based on a mass.

Example 1

30 parts of a natural rubber (pale crepe), 70 parts of an isoprene rubber (trade name of "Cariflex309" manufactured by Shell Co., Ltd.), 3 parts of sulfur, 1 part of a guanidine type vulcanization accelerator (trade name of "Nocceler D" manufactured by Ouchi Shinko Kagaku Kogyo Co., Ltd.), 0.5 part of a sulfenamide type vulcanization accelerator (trade name of "Nocceler CZ-G" manufactured by Ouchi Shinko Kagaku Kogyo Co., Ltd.), 0.5 part of zinc oxide, 1 part of stearic acid and 1 part of 2,2'-methylene bis (4-ethyl-6-tert-butyl phenol) as an antioxidant (trade name of "Yoshinox 425" manufactured by Yoshitomi Seiyaku Co., Ltd.) were put and kneaded in a kneader to obtain a rubber composition. The rubber composition was formed into the shape of a ribbon and was put in a cylinder of a roller head extruder. Then, the rubber composition was extruded from a head portion including a die having a thickness of 4 mm and a width of 30 mm so that a sheet having a width of 300 mm, a length of 30 m and a thickness of 0.4 mm was obtained. An internal temperature of the cylinder was set to 70° C., a temperature of the head portion was set to 90° C., a roll temperature was set to 90° C., and the number of rotations of a screw was set to 20 rpm.

The sheet-shaped rubber composition thus obtained was continuously crosslinked by using the continuous crosslinking device (the Rote-Cure manufactured by the Adamson Co., Ltd. in U.S.A.) shown in FIG. 2. A crosslinking temperature was set to 150° C., a pressure was set to 0.2 MPa and a crosslinking time was set to 5 minutes.

Examples 2 to 4

A crosslinked sheet material was obtained in the same manner as that in the example 1 except that a space between rollers of a roller head extruder was changed.

Examples 5 and 6

A crosslinked sheet material was obtained in the same manner as that in the example 1 except that a pressure was set to 0.05 MPa during continuous crosslinking and a space between rollers of a roller head extruder was changed.

Comparative Example

A sheet-shaped rubber composition was obtained in the same manner as that in the example 1 except that 1 part of an n-butyl aldehyde-aniline condensate (trade name of "Vanax 808" manufactured by Kawaguchi Kagaku Co., Ltd.) was used as a vulcanization accelerator and stearic acid was not blended. The rubber composition was wound onto a drum and was put in a vulcanizer, and was then crosslinked for 150 minutes at a temperature of 130° C. Thus, a crosslinked sheet material was obtained.

Reference Example 30 parts of a natural rubber latex (based on a solid content), 70 parts of an isoprene rubber latex (based on a solid content), 3 parts of sulfur, 1 part of a vulcanization accelerator (the above-mentioned "Vanax 808"), 0.5 part of zinc oxide and 1 part of an antioxidant (the above-mentioned "Yoshinox 425") were blended to obtain a rubber latex composition. A cloth conveyer belt having a surface coated with a coagulant was immersed in the rubber latex composition and the rubber latex composition was stuck onto the surface of the conveyer belt. The stuck substance was dried and then peeled from the conveyer belt. Thus, a sheet material having a width of 300 mm and a length of 30 m was obtained. The sheet material was wound up and put in the vulcanizer, and was then crosslinked on the same conditions as those in the comparative example. Consequently, a crosslinked sheet material was obtained.

Measurement of Thickness of Thin Sheet Material

Figure 3:
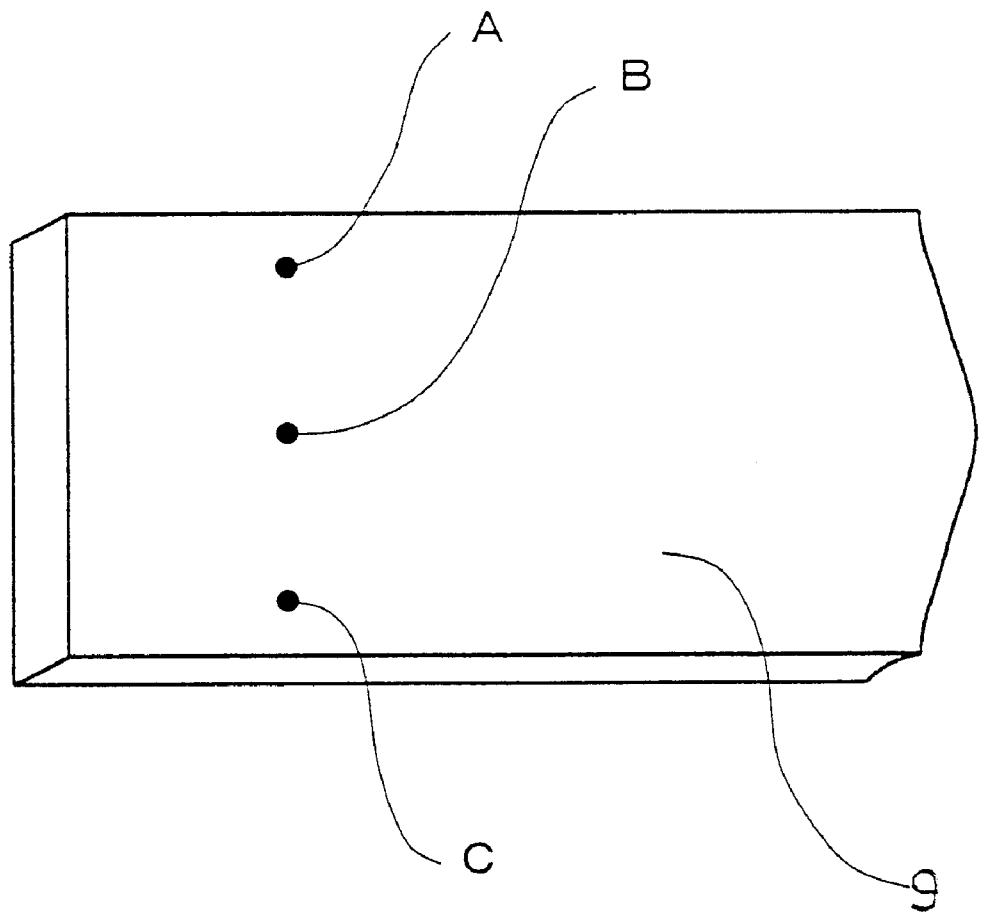
FIG. 3 is a perspective view showing a place where a thickness of a crosslinked sheet material is to be measured.

As shown in FIG. 3, a thickness was measured in three points, that is, points A and C positioned apart from an end of a crosslinked sheet material 9 in a cross direction by 20 mm and a point B being a center in the cross direction. The measurement was repeated 30 times on the three points (the points A, B and C) at an interval of 1 m in a longitudinal direction of the crosslinked sheet material 9. By using data thus obtained in 90 portions, a mean thickness and a standard deviation σ were calculated. These results are shown in the following Table 1.

Measurement of Ten-Point Mean Roughness Rz

By using a surface roughness meter (manufactured by Tokyo Seimitsu Co., Ltd.) in accordance with JIS-B-0601, a ten-point mean roughness Rz of the crosslinked sheet material was measured. The result is shown in the Table 1.

Measurement of Modulus

The crosslinked sheet material was punched like a No. 4 dumbbell to prepare a specimen, and a modulus for 800% stretch was measured in accordance with JIS-K-6301. The result is shown in the Table 1.

Measurement of Number of Thread Cuts 100 parts of a butadiene rubber having 98% of a cis-1, 4 component (trade name of "BR01" manufactured by Japan Synthetic Rubber Co., Ltd.), 5 parts of zinc oxide (trade name of "Zinc White No. 1" manufactured by Sakai Kagaku Kogyo Co., Ltd.), 75 parts of barium sulfate (trade name of "Barico #100" manufactured by Sakai Kagaku Kogyo Co., Ltd.), 1 part of stearic acid, 1 part of N-cyclohexyl-2-benzothiazolyl-sulfenamide as a vulcanization accelerator (trade name of "Nocceler CZ" manufactured by Ouchi Shinko Kagaku Co., Ltd.), 0.2 part of tetramethylthiuram-disulfide as another vulcanization accelerator (trade name of "Nocceler TT" manufactured by Ouchi Shinko Kagaku Co., Ltd.) and 9 parts of sulfur were kneaded. A rubber composition thus obtained was put in a mold including a spherical cavity. Then, the rubber composition was crosslinked for 30 minutes at a temperature of 150° C. Consequently, a center having a diameter of 32 mm was obtained.

On the other hand, a crosslinked sheet material was cut to have a width of 1.8 mm. Thus, a rubber thread was obtained. Then, the rubber thread was wound onto the center by means of a winding machine while being stretched under a load of 9N. Thus, a core was obtained. The winding was carried out for 100 centers to count the number of centers generating thread cuts before the core was finished. The result is shown in the Table 1.

Measurement of Deformation of Core

First of all, an initial load of 98N was applied to the core obtained by the measurement of the thread cuts, and a load was gradually increased and a final load of 1274N was then applied. Thus, a deformation of the core was measured from the application of the initial load to that of the final load. A mean value obtained by the measurement for 10 cores is shown in the Table 1.

Measurement of Resilience Coefficient of Core

A hollow cylinder made of aluminum and having a mass of 200 g was caused to collide with the core obtained by the measurement of the number of the thread cuts at a speed of 40 m/s. Thus, a resilience coefficient of the core was obtained in accordance with the law of conservation momentum. A mean value obtained by the measurement for 10 cores is shown in the Table 1.

TABLE 1

Result of Evaluation of Rubber Thread

|  | Example 1 | Example 2 | Example 3 | Example 4 | Example 5 | Example 6 | Comparative Example | Reference Example |
|---|---|---|---|---|---|---|---|---|
| Natural Rubber | 30 | 30 | 30 | 30 | 30 | 30 | 30 | 30 |
| Isoprene Rubber | 70 | 70 | 70 | 70 | 70 | 70 | 70 | 70 |
| Sulfur | 3 | 3 | 3 | 3 | 3 | 3 | 3 | 3 |
| Vulcanization Accelerator Van-ax | — | — | — | — | — | — | 1 | 1 |
| Vulcanization Accelerator D | 1 | 1 | 1 | 1 | 1 | 1 | — | — |
| Vulcanization Accelerator CZ-G | 0.5 | 0.5 | 0.5 | 0.5 | 0.5 | 0.5 | — | — |
| Zinc Oxide | 0.5 | 0.5 | 0.5 | 0.5 | 0.5 | 0.5 | 0.5 | 0.5 |
| Stearic Acid | 1 | 1 | 1 | 1 | 1 | 1 | — | — |
| Antioxidant | 1 | 1 | 1 | 1 | 1 | 1 | 1 | 1 |
| Blend Method | Dry Blend | Dry Blend | Dry Blend | Dry Blend | Dry Blend | Dry Blend | Dry Blend | Latex Blend |
| Crosslinking Method | Continuous Crosslinking | Continuous Crosslinking | Continuous Crosslinking | Continuous Crosslinking | Continuous Crosslinking | Continuous Crosslinking | Vulcanizer | Vulcanizer |
| Pressure (MPa) | 0.2 | 0.2 | 0.2 | 0.2 | 0.05 | 0.05 | — | — |
| Workbility | ○ | ○ | ○ | ○ | ○ | ○ | ○ | X |
| Thickness of Crossliked Sheet Material (mm) | 0.35 | 0.41 | 0.51 | 0.65 | 0.33 | 0.52 | 0.51 | 0.52 |

TABLE 1-continued

Result of Evaluation of Rubber Thread

|  | Example 1 | Example 2 | Example 3 | Example 4 | Example 5 | Example 6 | Comparative Example | Reference Example |
|---|---|---|---|---|---|---|---|---|
| σ of Thickness of Crossliking Sheet Material | 0.013 | 0.014 | 0.012 | 0.012 | 0.016 | 0.015 | 0.015 | 0.013 |
| R z of Crossliked Sheet Material (μm) | 15 | 17 | 19 | 20 | 31 | 33 | 76 | 42 |
| Modulus of Crossliked Sheet Material (MPa) | 4.16 | 4.16 | 4.16 | 4.16 | 3.96 | 3.96 | 3.99 | 3.99 |
| Number of thread Cuts | 0 | 0 | 0 | 0 | 5 | 3 | 49 | 4 |
| Deformation of Core (mm) | 3.37 | 3.78 | 3.98 | 4.12 | 3.26 | 3.99 | 3.98 | 3.96 |
| Resilience Coefficient of Core | 0.8251 | 0.8174 | 0.8133 | 0.8101 | 0.8257 | 0.8255 | 0.8210 | 0.8103 |

In the Table 1, the rubber thread crosslinked in the vulcanizer according to the comparative example has a great ten-point mean roughness Rz. Consequently, the thread cutting was often generated. Moreover, the rubber thread obtained by the latex blend method according to the reference example has a poor workability. On the other hand, in the rubber thread crosslinked by the continuous crosslinking device after the dry blending according to each example, the number of thread cuts is small. Furthermore, the thread rubber according to each example was obtained by the dry blend method. Therefore, a greater workability can be obtained as compared with the latex blend method. Based on these results of evaluation, advantages of the present invention were confirmed.

While the preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method of manufacturing a rubber thread for a golf ball comprising the steps of:
   (a) feeding the rubber composition between a heat roller and a belt pressed against the heat roller,
   (b) simultaneously pressurizing and crosslinking the rubber composition by means of the heat roller and the belt, thereby obtaining a crosslinked sheet material; and
   (c) cutting the crosslinked sheet material to obtain the rubber thread.

2. The method of manufacturing a rubber thread for a golf ball according to claim 1, wherein a pressure to be applied to the rubber composition at the crosslinking step is 0.03 MPa to 1 MPa.

3. The method of manufacturing a rubber thread for a golf ball according to claim 1, wherein the rubber composition fed at the crosslinking step is formed into a sheet by an extruder.

4. A rubber thread for a golf ball obtained from a crosslinked sheet material which is prepared by simultaneously pressurizing and crosslinking a rubber composition fed between a heat roller and a belt pressed against the heat roller, wherein a ten-point mean roughness Rz of the rubber thread is 40 μm or less.

5. The rubber thread for a golf ball according to claim 4, wherein a thickness is 0.35 mm to 0.6 mm.

6. The rubber thread for a golf ball according to claim 4, wherein the ten-point mean roughness Rz is 20 μm or less.

* * * * *